(12) United States Patent
Bakk

(10) Patent No.: US 9,534,774 B2
(45) Date of Patent: Jan. 3, 2017

(54) RETROFIT LED-LAMP

(71) Applicant: Tridonic Jennersdorf GmbH, Jennersdorf (AT)

(72) Inventor: Istvan Bakk, Törökbalint (HU)

(73) Assignee: Tridonic Jennersdorf GmbH, Jennersdorf (AT)

( * ) Notice: Subject to any disclaimer, the term of this patent is extended or adjusted under 35 U.S.C. 154(b) by 0 days.

(21) Appl. No.: 14/848,871

(22) Filed: Sep. 9, 2015

(65) Prior Publication Data

US 2016/0025275 A1 Jan. 28, 2016

Related U.S. Application Data

(62) Division of application No. 13/511,568, filed as application No. PCT/EP2010/058476 on Jun. 16, 2010, now Pat. No. 9,157,580.

(30) Foreign Application Priority Data

Nov. 30, 2009 (DE) .......................... 10 2009 056 115

(51) Int. Cl.
| | |
|---|---|
| *F21V 29/00* | (2015.01) |
| *F21V 29/70* | (2015.01) |
| *F21K 99/00* | (2016.01) |
| *F21V 3/02* | (2006.01) |
| *F21V 23/00* | (2015.01) |
| *F21V 3/00* | (2015.01) |
| *F21Y 101/00* | (2016.01) |

(52) U.S. Cl.
CPC .................. *F21V 29/70* (2015.01); *F21K 9/00* (2013.01); *F21K 9/23* (2016.08); *F21K 9/232* (2016.08); *F21V 3/02* (2013.01); *F21V 23/009* (2013.01); *F21V 29/004* (2013.01); *F21V 3/00* (2013.01); *F21Y 2101/00* (2013.01); *Y02B 20/383* (2013.01)

(58) Field of Classification Search
CPC ........ F21V 29/004; F21V 29/20; F21V 29/22; F21V 29/24; F21V 29/242; F21V 29/244; F21V 29/246
See application file for complete search history.

(56) References Cited

U.S. PATENT DOCUMENTS

| 7,758,223 | B2 * | 7/2010 | Osawa | .................... F21K 9/135 362/240 |
| --- | --- | --- | --- | --- |
| 8,143,770 | B2 * | 3/2012 | Chan | ........................ F21K 9/00 313/318.05 |

(Continued)

*Primary Examiner* — Jeffrey Zweizig
(74) *Attorney, Agent, or Firm* — The H.T. Than Law Group

(57) ABSTRACT

The invention relates to a retrofit LED lamp having an LED module, a driver circuit for supplying power to the LED module, a base for making mechanical and electrical contact with a bulb fitting and a heat sink arrangement for dissipating the heat produced during operation at the LED module and/or the driver circuit. The heat sink arrangement in this case has a metal mount insert consisting of a mount plate with an integrally attached collar, the mount plate bearing, in thermally conductive contact, the LED module, and a transparent upper shell being fitted to the collar of the mount insert in the light exit direction and a thermally conductive lower shell being fitted, in areal contact, in the direction of the base for heat dissipation, said upper shell and said lower shell together forming a housing of the LED lamp which surrounds the LED module and the mount insert.

24 Claims, 2 Drawing Sheets

(56) References Cited

U.S. PATENT DOCUMENTS

| | | | | |
|---|---|---|---|---|
| 8,189,335 B2* | 5/2012 | Janssen | ............... | H01L 23/3735 361/704 |
| 8,226,270 B2* | 7/2012 | Yamamoto | ............ | F21K 9/1355 362/294 |
| 8,258,682 B2* | 9/2012 | Villard | .................... | F21V 19/02 313/46 |
| 8,274,241 B2* | 9/2012 | Guest | ....................... | F21K 9/135 313/46 |
| 8,294,356 B2* | 10/2012 | Suwa | .................... | F21K 9/1375 313/46 |
| 8,450,927 B2* | 5/2013 | Lenk | ......................... | F21K 9/00 313/46 |
| 8,608,366 B2* | 12/2013 | Wang | ........................ | F21K 9/13 362/649 |

* cited by examiner

RETROFIT LED-LAMP

CROSS-REFERENCE TO RELATED PATENT APPLICATIONS

The present application is a continuation of pending U.S. patent application Ser. No. 13/511,568 entitled "Retrofit LED-Lamp" filed on May 23, 2012, which claims priority under 35 U.S.C. §371 to international patent application no. PCT/EP2010/058476 entitled "Retrofit LED-Lamp" filed on Jun. 16, 2010, which claims priority to German patent application serial no. 10 2009 056 115.3 filed on Nov. 30, 2009. The parent patent applications are incorporated herein by reference in their entireties.

BACKGROUND OF THE INVENTION

The invention relates to an LED lamp. The invention focuses in particular on so-called retrofit LED lamps which are designed as a replacement for halogen lamps or incandescent lamps.

LED lamps are being used more and more often for lighting purposes. Said LED lamps are characterized by their high light efficiency and their long life. Furthermore, they can be used very flexibly owing to their extremely small dimensions. LEDs are usually produced as LED modules. Conceivable here are LED modules comprising at least one blue LED which produces white light by means of wavelength conversion means arranged on the LED. Any desired colors can be produced by means of RGB LED modules, with it being possible to implement adjustment and dimming via PWM driving of the individual color channels.

Particularly preferably, LED lamps in the form of so-called retrofit LED lamps are used. In this case, the LED lamp is designed in terms of its mechanical and electrical connections to replace existing light-emitting means (incandescent bulb, halogen, . . . ). In order to match the supply current, the retrofit LED lamp also generally has a dedicated driver circuit, which matches the supply current to the operating conditions of the LEDs on the basis of, for example, a system voltage supplied via the base. Thus, the retrofit LED lamps, in the same way as conventional incandescent bulbs, can be screwed into conventional lampholders and operated by means of the supplied system current.

However, in the case of LEDs there is the problem that the LED chips and/or their driver circuit generate heat during operation which can result, inter alia, in undesired changes in the emitted color spectrum and in a shorter life. Correspondingly, it is important to provide effective cooling of the LED. Cooling is also advantageous for reliable operation of the driver circuit for the LED. Owing to the use of LEDs in retrofit LED lamps, however, space is very limited, and therefore it is not possible to use large and therefore powerful cooling systems. Therefore, it is even more critical to use a particularly efficient cooling system which can be used in a small space and can nevertheless dissipate a very large amount of heat.

SUMMARY OF THE INVENTION

The invention is therefore based on the object of providing an efficient and space-saving heat sink arrangement for an LED lamp, in particular for a retrofit LED lamp.

The object is achieved according to the invention by the features of the independent claims. The dependent claims represent advantageous developments of the invention.

One aspect of the invention relates to a heat sink arrangement for dissipating the heat produced during operation at a light source, in particular at an LED module, and/or at a driver circuit for the light source, having:

a mount insert consisting of a mount plate with an integrally attached collar, the mount plate bearing, directly or indirectly, in thermally conductive contact, the LED module, a thermally conductive lower shell being fitted to the collar of the mount insert in the direction of the base in areal contact for heat dissipation.

The mount insert can be manufactured from a material with good thermal conductivity which preferably has a thermal conductivity of at least 10 W/mK.

The mount insert can be formed from metal, plastics and/or ceramic.

The thermally conductive lower shell can consist of one or more layers of a plastics material, metal and/or ceramic.

The thermal conductivity of the plastics material, for example a polymer, or the ceramic is in this case preferably greater than 1 watt/meter Kelvin, preferably greater than 2 watts/meter Kelvin.

The lower shell can consist of an inner and an outer layer, the inner layer producing a full-area contact with at least one part of the outer layer.

The outer layer of the lower shell can be applied at least partially as a coating to the inner layer of the lower shell element.

The inner layer of the lower shell can consist of metal, in particular of aluminum.

The outer layer of the lower shell can consist of an electrically insulating material.

The inner layer and the outer layer of the lower shell can be formed as separate parts.

The annular region in which the lower shell overlaps the collar of the mount insert can have a lateral height of preferably greater than 2 mm, further preferably greater than 3 mm.

The collar of the mount insert can be accommodated in a recess in the inner side of the lower shell, with the result that the inner face of the collar of the mount insert terminates flush with the inner side of the region of the lower shell with a greater wall thickness.

A further aspect of the invention relates to a retrofit LED lamp, having:

at least one heat sink arrangement as claimed in one of the preceding claims, an LED module with one or more LED chips, a driver circuit for supplying power to the LED module, and a base for making mechanical and electrical contact with a bulb fitting, and a transparent upper shell, which is fitted to the collar of the mount insert and/or to the lower shell in the light exit direction of the LED chip.

The lower shell and the upper shell can form a housing for the LED lamp which surrounds the LED module and the mount insert.

The lower shell and the collar of the mount insert can form a hollow body, in which at least part of the driver circuit for the LED module is arranged.

The outer layer of the lower shell and the upper shell can consist of an electrically insulating material.

The lower shell can surround the driver circuit with a gap.

The outer layer of the lower shell and the upper shell can have a thickness of at least 100 μm, preferably of at least 200 μm, further preferably of at least 500 μm and most preferably of at least 1000 μm.

The outer layer of the lower shell and the upper shell can consist of an electrically insulating material.

An electrical insulation can be provided between the driver circuit and the inner layer of the lower shell.

The outer layer of the lower shell can be applied at least partially as a coating to the inner layer of the lower shell element.

The outer layer of the lower shell can have a fluted form so as to increase the surface area, at least in the region of the lower part of said lower shell.

The lamp base can be connected areally to the lower part of the outer and/or the inner layer, with the result that a high degree of heat emission from the inner and/or the outer layer is ensured.

The LED module can have at least one RGB LED module and/or at least one phosphor-converted monochromatic LED with at least one monochromatic LED.

The driver circuit can have an AC-to-DC converter and/or a DC-to-DC converter, in particular with a PWM-operated switch.

The LED lamp can have a lamp base for making mechanical and electrical contact between the LED lamp and a lampholder, the lamp base being an E14, E17 or E27 screw-type base or a G4, G5 or G6 pin-type base or a BA9 or BA15 bayonet-type base.

The lamp base can be connected areally to the lower part of the outer and/or the inner layer of the lower shell, with the result that a high level of heat emission from the inner and/or the outer layer is ensured.

BRIEF DESCRIPTION OF THE DRAWINGS

Further advantages, properties and features of the invention will now be explained with reference to the figures in the attached drawings, in which.

DETAILED DESCRIPTION OF THE INVENTION

Figure 1:
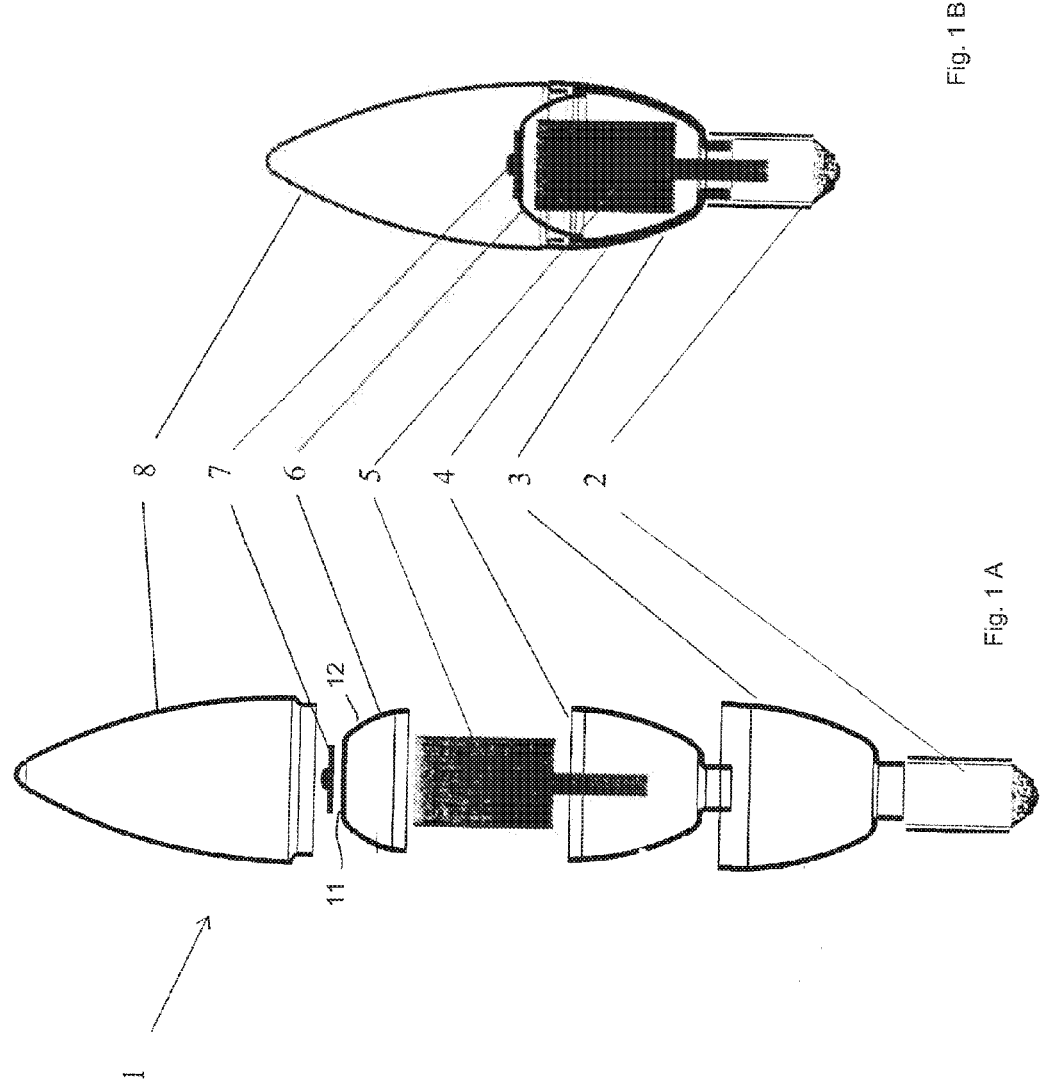
FIG. 1a shows an embodiment according to the invention of a retrofit LED lamp in an exploded view.
FIG. 1b shows the embodiment shown in FIG. 1a in the assembled state.

FIGS. 1a and 1b show an embodiment according to the invention of an LED lamp 1 with an LED module 7. This is a retrofit LED lamp 1 for use in a conventional lampholder. For this, the lamp 1 has a conventional base 2, for example with an E14, E17 or E27 screw thread. Alternatively, a base is also conceivable which is designed for a low-voltage connection, such as a G4, G5 or G6 pin-type base. Also conceivable is a BA9 or BA15 bayonet-type base.

When the retrofit LED lamp 1 is supplied with AC system voltage or with a low voltage through a corresponding lampholder, current matching is required for correct operation of the LED module 7. For this, a driver circuit 5 is provided. Said driver circuit can have any conceivable drive circuit for this use, as is known from the prior art. One possibility here is, for example, an AC-to-DC converter for rectifying an AC system voltage. Advantageously, a DC-to-DC converter or another converter can be connected downstream thereof, which reduces the voltage or the current or the power. In this case, a switch can be used which is operated by means of pulse width modulation (PWM). Also conceivable is a downstream current limitation circuit, for example using a transistor circuit.

The LED module 7 can have one or more LEDs and/or OLEDs. In this case, in particular phosphor-converted monochromatic, for example blue, LEDs, RGB LED modules or any combinations thereof can be used. The phosphor-converted LEDs are in particular at least one blue LED, in the case of which some of the emitted blue light is converted into yellow or green-yellow light by color conversion means such as phosphor. The use of phosphor-converted green and/or green-white LEDs is also conceivable. Preferably, one or more red LEDs (or other monochromatic LEDs) are also used which result in a higher color rendering index CRI and provide a warmer light. The red LEDs can in this case be arranged separately from the phosphor-converted blue LEDs, or they can be located next to said phosphor-converted blue LEDs, with the result that some of their emitted red light is likewise phosphor-converted.

The LED module can be realized as a COB ("Chip-on-Board") module.

According to the invention, the LED module 7 now rests on a mount insert 6, which is part of a heat sink arrangement. Thus, the LED module and the mount insert 6 are connected to one another areally. In this case, the mount insert 6 is as flat as possible in the region in which the LED module rests, whereby the mount insert 6 and the LED module 7 have as large a contact area as possible, i.e. they are connected to one another over the full area. The mount insert 6 can in this case consist of an upper part 6 and a lower part 4. Thus, the mount insert 6 can at least partially enclose the driver circuit 5. The lower part 4 advantageously has an opening in the lower side, through which the driver circuit 5 can protrude or through which a conductor can protrude, said conductor producing an electrical contact with power supply. The upper part 6 also has an outwardly curved form, with the result that there is sufficient space for the driver circuit on the inner side of said upper part. On its outer side, preferably in the center of the curvature, it has a flat region, on which the LED module 7 is fitted. The upper part 6 can therefore have an approximately hemispherical form, which is flattened on its upper side.

The upper and lower parts 6 and 4 are connected to one another as areally as possible and thus have heat transmission between the parts and a strong mechanical fixing. For this, a bayonet-type closure, a screw thread or a linear, conical or stepped connection can be used. It is also conceivable for one part to be inserted into the other in the manner of a clip. Owing to the two-part embodiment of the inner layer, the LED module 7 can also be attached to the mount insert 6 more easily since, for this, the upper side can be used separately from the lower side, and the driver circuit 5 can also be inserted more easily. The upper side 6 can additionally have optical means in the region of the LED module, such as a cavity, in which the LED module is fitted. In this case, however, it is advantageous if the generated light can emerge at a large angle.

The mount insert 6 can consist of a material with good thermal conductivity, such as metal, for example aluminum. The use of plastics, ceramic or any desired combinations thereof is also conceivable.

The mount insert 6 can overlap the lower part of the housing (or lower shell) over as large a surface area as possible. The mount insert 6 is in areal contact with at least the inner layer of the lower part, at least at its collar 10, with a length L (in the side view in FIGS. 1a and 1b) of at least preferably 2 mm.

The heat sink arrangement furthermore has an outer layer, which surrounds the mount insert, the outer layer having as large a surface area as possible. This layer also consists of an upper part 8 and a lower part 3. These parts can preferably be connected to one another via a thread or by means of adhesive bonding, whereby a high mechanical fixing effect and a high level of heat transmission through a large common surface area between the parts are ensured. The outer layer preferably consists of a nonconductive material such as plastics or at least of a material with poor conductivity which has an insulating property. Furthermore, it has a lower thermal conductivity than the inner layer.

This results in the advantageous effect that heat from the heat source, i.e. from the LED module and also from the driver circuit, is transported away quickly by means of the inner layer and then absorbed by the outer layer. For this purpose, the inner layer and the outer layer bear at least partially flush against one another. In the exemplary embodiment shown in FIG. 1b, this is the case for both lower parts 4 and 3. Therefore, both layers have a surface area adjoining one another which is as large as possible, and thus heat transmission which is as great as possible between the two layers is ensured.

For this, the two lower parts 4 and 3 are also shaped in such a way that they bear against one another as far as possible without an air gap. They can have, for example, a conical form with low tolerances. It is also conceivable for the layers to have a mutually corresponding interengaging structure, such as ribs or corrugations, in order to increase the adjoining surfaces of the outer and inner layers.

There is a space between the upper parts of the mount insert 6 and the outer layer 8, with the LED module being located in said space. This space can have optical means, such as a lens. Furthermore, it is possible for this space to be filled at least partially, for example with a transparent material, with the result that heat emission can take place between the two upper parts as well.

The lower part of the outer layer is connected to the lamp base 2 in such a way that both parts have a large common surface. Therefore, a high level of heat transmission between the outer layer and the lamp base is ensured.

The outer layer is also at least partially translucent or transparent, in particular in the region of the upper part 8, with the result that the light generated by the LED module 7 shines through. The upper part 8 can also have optical properties such as a lens, diffuser particles or the like.

The outer layer has a thickness of at least 100 μm, preferably of at least 200 μm and further preferably of at least 500 μm, but most preferably of at least 1000 μm.

There may be a gap between the mount insert and the driver circuit. This gap can be filled with air. It is also conceivable for said gap to be filled with a casting compound. In this case, the casting compound can also represent a connection of all of the parts of the cooling arrangement, the lamp base 2 and the driver circuit. Thus, mechanical fixing and heat transmission between the parts are favored.

Contact between the mount insert and the outer layer can also be produced by virtue of the fact that the outer layer is applied over the metallic mount insert by means of a molding method. Mechanical fixing can in this case be produced via standard procedures, such as ribs or cavities in the metal insert. The outer layer and the metal mount insert can also be connected to one another by means of a bonding agent, for example adhesive, lubricating grease, cement or an elastomer.

The mount insert can have, at least partially, an additional, third layer on its inner surface. This layer has insulating properties. Therefore, the driver circuit can be further protected against short circuits. In this case, it is conceivable for this insulating layer to have a cutout in the region below the LED module, with the result that an electrical connection between the driver circuit and the LED module can be produced via the inner, conducting layer. However, it is also conceivable for the third layer to be designed to be continuous and for a bore to be drilled through the inner layer and the third layer in the region of the LED module in order to make contact between said LED module and conductors.

In the preceding embodiment, therefore, it is assumed that the mount insert consists of two assembled parts with a high thermal conductivity, for example metal parts 4, 6, with the upper part being in thermal contact with the LED printed circuit board. A second lower part 3 forms the rear side of a candle-shaped retrofit LED lamp and extends as far as the base of the LED lamp. The rear metal part is coated (encapsulated by injection molding) on the outside with a thin plastics material with a thickness of 0.5 mm, for example, said plastics material having an electrically insulating effect.

Figure 2:
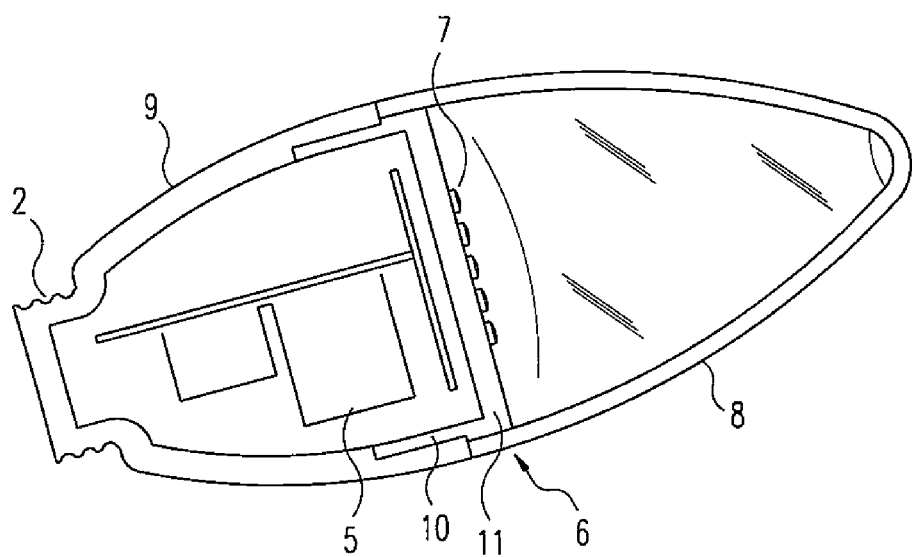
FIG. 2 shows a further embodiment according to the invention of a retrofit LED lamp with a single-part lower shell.

In contrast to this, FIG. 2 shows a further embodiment according to the invention of an LED lamp, in which the mount insert 6 consists of a material with good thermal conductivity, for example metal, ceramic, plastics, which preferably has a thermal conductivity of at least 10 W/mK. This is, for example, a metal mount insert 6 consisting of a mount plate 11 with an integrally attached collar 10, the mount plate 11 again bearing the LED module, with thermally conductive contact.

The rear part, i.e. the lower shell, is integral, in contrast to the multi-part design shown in FIG. 1, and may consist, for example, of a thermally conductive plastics material, for example a polymer, or a ceramic. Materials which command a thermal conductivity of at least preferably 1 W/mK, more preferably at least 2 W/mK, can be used in this exemplary embodiment.

In this case, a transparent upper shell 8 is fitted to the collar 10 of the mount insert 6 in the light exit direction and the thermally conductive, preferably integral lower shell 9 is fitted to the collar 10 of the mount insert 6, with areal contact, in the direction of the base for heat dissipation, said upper and lower shells together forming a housing of the LED lamp which surrounds the LED module and the mount insert 6.

In this case, the wall thickness of the lower shell in the region in which it overlaps with the heat sink 6, i.e. its collar region, and is in contact therewith over the full area, is only 2 mm, for example. In that region of the lower shell in which there is no overlap, the wall thickness is greater, for example in a range of from 3 to 5 mm.

The majority of the heat transfer towards the outside will therefore take place in the region of the collar of the mount insert through the full-area contact with the lower shell, which consists of a thermally conductive plastics material, for example.

Preferably, the collar of the mount insert is accommodated in a recess in the inner side of the thermally conductive plastics material, with the result that the inner face of the mount insert terminates flush with the inner side of the region of the thermally conductive plastics material with a greater wall thickness.

Since the lower shell 9 consisting of plastics material and therefore also the inner side naturally have electrically insulating properties, the driver circuit can be protected from short circuits without any further structural modifications.

The further features of this embodiment do not differ from the features of the preceding embodiment and are therefore not described in any further detail.

The invention claimed is:

1. A heat sink arrangement for dissipating the heat produced during operation at a light source, in particular at an LED module, and/or at a driver circuit for the light source, having:
   a mount insert comprising a mount plate with an integrally attached collar, the mount plate bearing, in thermally conductive contact, the LED module, and
   a thermally conductive lower shell being fitted to the collar of the mount ins areal contact in the direction of the base for heat dissipation,
   in which the thermally conductive lower shell consists of at least one layer of a metal, a plastics material or a ceramic, wherein the thermal conductivity of the plastics material or ceramic is greater than 1 watt/meter Kelvin, preferably greater than watts/meter Kelvin, and
   wherein said heat sink arrangement consists of a single heat path from the mount insert to the thermally conductive lower shell.

2. The heat sink arrangement as claimed in claim 1, in which the mount insert is manufactured from a material with good thermal conductivity which preferably has a thermal conductivity of at least 10 W/mK.

3. The heat sink arrangement as claimed in claim 1, in which the mount insert is formed from metal, plastics and/or ceramic.

4. The heat sink arrangement as claimed in claim 1, in which the lower shell is integral.

5. The heat sink arrangement as claimed in claim 1 in which the lower shell has a lower wall thickness at the collar region where it overlaps the mount insert and a greater thickness in the range of no overlap.

6. The heat sink arrangement as claimed in claim 5, in which the thickness of the lower shell in the region of overlap is 2 mm and in the region of no overlap is in the range of between 3 mm to 5 mm.

7. The heat sink arrangement as claimed in claim 1, in which an annular region in which the lower shell overlaps the collar of the mount insert is a lateral height of greater than 2 mm, further preferably greater than 3 mm.

8. The heat sink arrangement as claimed in claim 1, in which the collar of the mount insert is accommodated in a recess in an inner side of the lower shell, with the result that an inner face of the collar of the mount insert terminates flush with the inner side of the region of the lower shell with a greater wall thickness.

9. The retrofit LED Lamp as claimed in claim 1, in which the plastics material is a polymer.

10. A retrofit LED-lamp having at least one heat sink arrangement for dissipating the heat produced during operation at a light source, in particular at an LED module, and/or at a driver circuit for the light source, having a mount insert comprising a mount plat with an integrally attached collar, the mount plate bearing, in thermally conductive contact, the LED module, and a thermally conductive lower shell being fitted to the collar of the mount insert in areal contact in the direction of the base for heat dissipation, in which the thermally conductive lower shell consists of at least one layer of a metal, a plastics material or a ceramic, wherein the thermal conductivity of the plastics materials or ceramic is greater than 1 watt/meter Kelvin, preferably greater than 2 watts/meter Kelvin, wherein said retrofit LED lamp comprises:
   the LED module with one or more LED chips, the driver circuit for supplying power to the LED module, and abuse for making mechanical and electrical contact with a bulb holder,
   further having a transparent upper shell, which is fitted to the collar of the mount insert or to the lower shell in the light exit direction of the LED chip.

11. The retrofit LED lamp as claimed in claim 10, in which the lower shell and the upper shell form a housing for the LED lamp which surrounds the LED module and the mount insert.

12. The retrofit LED lamp as claimed in claim 10, in which the lower shell and the collar of the mount insert form a hollow body, in which at least part of the driver circuit for the LED module is arranged.

13. The retrofit LED lamp as claimed in claim 10, in which the outer layer of the lower shell and the upper shell consist of an electrically insulating material.

14. The retrofit LED lamp as claimed in claim 10, in which the lower shell surrounds the driver circuit with a gap.

15. The retrofit LED tamp as claimed in claim 10, in which the outer layer of the lower shell and the upper shell have a thickness of at least 100 µm, preferably of at least 200 µm, further preferably of at least 500 µm and most preferably of at least 1000 µm.

16. The retrofit LED lamp as claimed in claim 10, in which the outer layer of the lower shell and the upper shell consist of an electrically insulating material.

17. The retrofit LED lamp as claimed in claim 10, in which an electrical insulation is provided between the driver circuit and the inner layer of the lower shell.

18. The retrofit LED lamp as claimed in claim 17, in which the outer layer of the lower shell is applied at least partially as a coating to the inner layer of the lower shell element.

19. The retrofit LED lamp as claimed in claim 18, characterized in that the lamp base is connected to a lower part of the outer and/or the inner layer, with the result that a high degree of heat emission from the inner and/or the outer layer is ensured.

20. The retrofit LED lamp as claimed in claim 10, in which the LED module has at least one RGB LED module and/or at least one phosphor-converted monochromatic LED with at least one monochromatic LED.

21. The retrofit LED lamp as claimed in claim 10, in which the driver circuit has an AC-to-DC converter and/or a DC-to-DC converter, in particular with a PWM-operated switch.

22. The retrofit LED lamp as claimed in claim 10, in which the LED lamp has a lamp base for making mechanical and electrical contact between the LED lamp and a lamp holder, the lamp base being an E14, E17 or E27 screw-type base or a G4, G5 or G6 pin-type base or a BA9 or BA15 bayonet-type base.

23. The retrofit LED lamp as claimed in claim 22, in which the lamp base is connected to the lower part of the outer and/or the inner layer of the lower shell, with the result that a high level of heat emission from the inner and/or the outer layer is ensured.

24. The retrofit LED Lamp as claimed in claim 10, in which the plastics material is a polymer.

* * * * *